(12) United States Patent
Blouin et al.

(10) Patent No.: US 10,948,418 B2
(45) Date of Patent: Mar. 16, 2021

(54) CHARACTERIZATION OF A MATERIAL USING COMBINED LASER-BASED IR SPECTROSCOPY AND LASER-INDUCED BREAKDOWN SPECTROSCOPY

(71) Applicant: NATIONAL RESEARCH COUNCIL OF CANADA, Ottawa (CA)

(72) Inventors: Alain Blouin, Montreal (CA); Mohamad Sabsabi, Longueuil (CA); Jean-Pierre Monchalin, Montreal (CA); Francis Vanier, Boucherville (CA)

(73) Assignee: NATIONAL RESEARCH COUNCIL OF CANADA

( * ) Notice: Subject to any disclaimer, the term of this patent is extended or adjusted under 35 U.S.C. 154(b) by 0 days.

(21) Appl. No.: 16/614,689

(22) PCT Filed: May 16, 2018

(86) PCT No.: PCT/CA2018/050578
§ 371 (c)(1),
(2) Date: Nov. 18, 2019

(87) PCT Pub. No.: WO2018/209437
PCT Pub. Date: Nov. 22, 2018

(65) Prior Publication Data
US 2020/0182795 A1    Jun. 11, 2020

Related U.S. Application Data

(60) Provisional application No. 62/508,452, filed on May 19, 2017.

(51) Int. Cl.
*G01N 21/71* (2006.01)
*G01N 21/39* (2006.01)

(52) U.S. Cl.
CPC .......... *G01N 21/718* (2013.01); *G01N 21/39* (2013.01); *G01N 2201/06113* (2013.01)

(58) Field of Classification Search
CPC ................. G01N 21/718; G01N 21/39; G01N 2201/06113; G01N 2021/399; G01N 21/3563; G01N 1/34
See application file for complete search history.

(56) References Cited

U.S. PATENT DOCUMENTS

| | | |
|---|---|---|
| 7,430,273 B2 | 9/2008 | Yellepeddi |
| 8,101,916 B2 | 1/2012 | Saul et al. |

(Continued)

FOREIGN PATENT DOCUMENTS

| | | |
|---|---|---|
| CA | 2781104 C | 5/2011 |
| CA | 2958760 A1 | 2/2016 |

(Continued)

OTHER PUBLICATIONS

International Search Report from PCT/CA2018/050578, dated Nov. 22, 2018.

(Continued)

*Primary Examiner* — David P Porta
*Assistant Examiner* — Meenakshi S Sahu

(57) ABSTRACT

A method and a system for characterizing an elemental composition and a molecular composition of a material are provided. Laser-based IR spectroscopy measurements and LIBS measurements are performed at a same analysis spot on the material. The IR spectroscopy measurement data can be used to characterize the molecular composition of the material, whereas the LIBS data can be used to characterize the elemental composition of the material. 2D and 3D profiles of a sample of the material may be obtained based on this data.

20 Claims, 9 Drawing Sheets

(56) References Cited

U.S. PATENT DOCUMENTS

| | | |
|---|---|---|
| 8,222,604 B2 | 7/2012 | McGill et al. |
| 8,421,017 B2 | 4/2013 | McGill et al. |
| 8,421,018 B2 | 4/2013 | McGill et al. |
| 8,547,540 B2 | 10/2013 | Beckstead et al. |
| 8,553,210 B2 | 10/2013 | Beckstead et al. |
| 8,582,089 B2 | 11/2013 | Nelson et al. |
| 9,285,272 B2 | 3/2016 | Sackett |
| 9,625,376 B2 | 4/2017 | Elsoee et al. |
| 9,970,876 B2 | 5/2018 | Sackett |
| 10,031,077 B2 | 7/2018 | Kotidis et al. |
| 2003/0095266 A1 | 5/2003 | Detalle et al. |
| 2011/0237446 A1 | 9/2011 | Treado et al. |
| 2016/0349174 A1 | 12/2016 | Washburn |

FOREIGN PATENT DOCUMENTS

| | | | |
|---|---|---|---|
| CA | 2969240 A1 | 6/2016 | |
| CN | 102507511 | * 11/2011 | ............. G01N 21/63 |
| CN | 102507511 A | 6/2012 | |
| WO | 2007068237 A1 | 6/2007 | |
| WO | 2014146719 A1 | 9/2014 | |
| WO | 2014202618 A2 | 12/2014 | |
| WO | 2015077867 A1 | 6/2015 | |

OTHER PUBLICATIONS

Supplementary European Search Report for EP 18 80 1786, Munich, dated Jan. 15, 2021.

\* cited by examiner

CHARACTERIZATION OF A MATERIAL USING COMBINED LASER-BASED IR SPECTROSCOPY AND LASER-INDUCED BREAKDOWN SPECTROSCOPY

CROSS REFERENCE TO RELATED APPLICATIONS

This application is a filing under 35 U.S.C. § 371 of International Patent Application PCT/CA2018/050578, filed on May 16, 2018, which claims priority to U.S. Provisional Application No. 62/508,452, filed on May 19, 2017, each of which is incorporated by reference in its entirety.

TECHNICAL FIELD

The present description generally relates to atomic and molecular spectroscopy and more specifically concerns a method and a system characterizing both the elemental composition and the molecular composition of a material.

BACKGROUND

Laser-induced breakdown spectroscopy (LIBS) is a well-known technique to retrieve elemental information from a given sample. A typical LIBS measurement is performed as follows: a short laser pulse is sent and focused onto a sample surface; the surface is rapidly heated by the laser pulse, part of the material is vaporized, and the gas is transformed into plasma, the plasma composition being representative of the sample's elemental content; excited electrons in the plasma eventually return to the ground state of their associated atoms as the plasma cools, and the radiative electron recombination emits photons with discrete energies allowed by their associated atoms energy levels; and the emitted photons are collected and sent in a spectrometer to produce optical emission spectra. The spectral distribution of the spectra (intensity versus frequency) is linked to the elemental composition of the plasma, hence to the elemental composition of the sample. For example, see U.S. Pat. No. 6,008,897 and references cited therein.

LIBS provided fast, localized, non-contact, and sensitive measurements of the elemental content of a given material. LIBS is relevant for identifying major elements and trace elements, the latter being typically measured with a sensitivity of few parts per million (ppm). LIBS is employed world-wide in diverse fields such as the sorting of minerals and recycling materials, and the content determination of molten metals, to name just a few. Furthermore, LIBS usually requires no sample preparation, or light pulses can be used to prepare the sample's surface by removing dust, dirt, water, and any unwanted layers such as oxides. Industrial large-scale LIBS system down to handheld portable LIBS system are already reported and known in the art.

One drawback of LIBS is that it is usually difficult to determine directly the molecular speciation based on the measured elemental information. Nonlinear responses, matrix effects and emission line interferences further limit the molecular information which can be gathered from LIBS measurements.

However, many applications require knowing both the elemental and the molecular compositions of objects. Such applications can for example be found in the analysis of soils or organic products incorporating elements which may be hazardous to the health. For example, it may be relevant in some applications to determine both the molecular composition and the relative quantities of lead, arsenic or other hazardous elements in a sample. It may be preferable to perform such measurements in a remote fashion to mitigate any risk due to hazardous elements presence. Furthermore, considering when two compounds are mixed and one of those compounds carries hazardous elements, a combined elemental and molecular probing at the heterogeneity scale of the mixture is necessary to identify which compound carries the hazardous elements.

In the mining sector, the quantity of a searched element must be determined, while also knowing how this element is combined with other elements present in the ore. Knowing the mineral composition of the valued ore and the gangue is fundamental for determining the processing steps needed to recover the searched element. The heterogeneity of mineral composition in ores is usually on the order of the millimeter and could be much below. Consequently, averaging measurements over an area larger than the heterogeneity scale causes errors, affects measurement precision, and ultimately affect the correct component identification. Furthermore, releasing processes of the searched element is linked to the element distribution within the ore. Sub-millimeter resolution measurements of the elemental and molecular content could determine the heterogeneity profile, thus indicating the proper releasing processes.

To be of use in practice, such applications have at least some of, and, in some cases, all the following requirements:
  no sample preparation;
  operation at a remote distance;
  in view of very heterogeneous characteristics of the samples, sub-millimeter resolution and point-to-point corresponding elemental and molecular measurements should be obtained;
  obtaining true bulk representation of the sample, which requires to eliminate sensitivity to surface contaminant and capability to through-depth measurement;
  adequate sensitivity and rapid acquisition, no need of long integration times to get a signal well above a noise background level;
  availability outside of a strictly controlled environment (e.g. can be implemented in a mine).

Although methods and systems using LIBS technique in combination with a separate molecular probing optical technique have been previously reported, none fully satisfy the requirements.

The combination of LIBS and Raman spectroscopy has been proposed in multiple references, such as for example U.S. Pat. No. 8,264,681. To perform Raman spectroscopy, a laser beam is first sent onto the sample. The photons of the laser beam may gain or lose energy due to Raman inelastic scattering with the sample matrix. These scattered photons are collected and measured. The Raman signal intensity is plotted as a function of the measured energy difference to create Raman spectra. The physical mechanism providing a Raman signal is based on the molecule's polarizability changes and is usually measured in the visible or near infrared part of the electromagnetic spectrum. The measured Raman signal wavelength is not the same as the probe signal wavelength. Conversely, IR spectroscopy signals comes from the molecule's dipole changes caused by the IR electromagnetic field sent to the sample.

Raman signal is weak by nature and that results in typical long integration times, of the order of a few seconds, and a lack of sensitivity. Moreover, Raman spectroscopy setups usually use visible and NIR laser sources that can also generate photoluminescence emission within the sample. Photoluminescence emission generally masks Raman spectral features. Two or more laser sources are then needed to mitigate this issue. Raman spectroscopy can therefore be impractical and fail to provide several of the desired features mentioned above.

Washburn in U.S. Pat. App. No. 2016/0349174 proposes a LIBS and vibrational spectroscopy combination for mineralogy and geochemistry of petroleum and reservoir rock samples. The proposed method uses Raman spectroscopy or Fourier transform infrared spectroscopy (FTIR) spectroscopy that is based on broadband and polychromatic light source. However, broadband sources have a poor beam steering and focusing capabilities. The proposed method by Washburn would fail if remote probing distance of several centimeters and sub-millimeter spatial resolution is needed. Washburn also proposed the use of FTIR microscopy to acquire spatially resolved measurements. However, FTIR microscopy cannot be performed in a remote fashion. For example, commercialized FTIR microscopy systems typically possess a working distance below 25 mm. Additionally, since FTIR microscopy working distance is short, it is technically difficult to perform LIBS measurements without tarnishing the FTIR microscope objectives. This implies sample repositioning for each measurement technique. Moreover, FTIR microscopy usually needs sample preparation such as sample picking, sample resizing and surface polishing, and thus prevents the proposed method to be applied in-situ, for example, on a rock or on the ground. Furthermore, the lower power density provided by broadband sources affects the sensitivity and the acquisition speed, and usually need averaging raw data over multiple measurements. The lower power density issue of broadband sources is critical when working in a remote fashion since the measured signal typically decreased with the square of the distance.

A combined LIBS and IR absorption spectroscopy technique is described by Elsoee et al. in U.S. Pat. App. No. 2016/0018325. The proposed IR spectroscopy method is based on an optical spectrophotometer to generate wavelength dependent intensity spectra. The use of an optical spectrophotometer implies the use of a broadband IR source. Again, broadband sources lack in beam steering, focusing capability, and in power density to work in a remote fashion with a sub-millimeter spatial resolution, and with adequate sensitivity and acquisition time.

U.S. Pat. No. 9,285,272 (Sackett) discloses a method involving the use of a high power laser to determine elemental concentration (i.e. a LIBS approach) and a lower power device to determine compounds of a sample. The lower power device refers to Raman spectroscopy or near IR absorption spectroscopy methods, the latter using a near IR lamp as a light source. The teachings of this reference do not alleviate the drawbacks mentioned above with respect to other dual approaches.

There remains a need for methods and systems allowing the dual determination of elemental and molecular composition of a sample that alleviates at least some of the drawbacks of the prior art.

SUMMARY

In accordance with one aspect, there is provided a method for characterizing an elemental composition and a molecular composition of a material.

The method includes a step a. of performing an infrared spectroscopic measurement on the material. The infrared spectroscopic measurement includes probing the material at an analysis spot with at least one infrared laser beam at a wavelength in the infrared domain, and detecting light in said infrared spectral domain resulting from an interaction of the at least one infrared laser beam with the material at the analysis spot.

The method further includes a step b. of performing a LIBS measurement on the material. The LIBS measurement involves vaporizing a volume of the material at the analysis spot using a LIBS pulsed laser source, thereby obtaining a plasma of the material. The LIBS measurement further includes making a spectrally resolved detection of light from the plasma.

In accordance with one aspect of the method, the infrared spectroscopic measurement of step a. and the LIBS measurement of step b. are performed at a plurality of locations of the material.

In some implementations, the at least one infrared laser beam may consist of a single infrared laser beam. The infrared spectroscopic measurement of step a. may include varying a wavelength of the infrared laser beam over a plurality of values in the infrared domain, and detecting the resulting light for each of these values, thereby obtaining a spectral variation of the interaction of the laser beam with the material at the analysis spot.

The infrared laser beam may be generated using a spectrally tunable laser source, including for example a Quantum Cascade Laser.

In some implementations, the performing of the infrared spectroscopic measurement may involve using a dual-frequency comb scheme. For example, the at least one infrared laser beam may include first and second infrared laser beams, the first and second infrared laser beams being optically coherent and defining respective first and second optical frequency combs at different first and second frequency spacings. The material is probed by one or both of the first and second infrared laser beams, and the detecting involves detecting a heterodyne signal resulting from an interference between the first and second optical frequency combs.

The method may further involve a preliminary step of cleaning a surface of the material at the analysis spot. This preliminary step may include performing one or more laser cleaning shots, at least one of the laser cleaning shots being optionally performed using the LIBS pulsed laser source.

In some implementations, the method may involve performing the infrared spectroscopic measurement of step a. for a set of said locations on the material, and subsequently performing the LIBS measurement of step b. for said set of said locations on the material.

In some implementations, the method may further include a step of analyzing the infrared spectroscopic measurement obtained at step a. to characterize the molecular composition of the material, and of analyzing the LIBS measurement obtained at step b. to characterize the elemental composition of the material. By way of example, the analysis of the infrared spectroscopic measurement may involve comparing the spectral variation of the interaction of the laser beam with the material with known molecular infrared reflection spectra to characterize the molecular composition of the material. In further implementations, the method may further include a step of analyzing a combined dataset comprising the infrared spectroscopy measurement and the LIBS measurement to characterize the molecular and elemental composition of the material. This analyzing of a combined dataset may involve performing a chemometric analysis.

In some implementations, performing the infrared spectroscopic measurement of step a. and the LIBS measurement of step b. at a plurality of locations on the material may involve moving the material to bring different regions thereof at the analysis spot. The material may for example be moved along a plane parallel to a surface of the material, and/or along a depth axis.

In some implementations, performing the infrared spectroscopic measurement of step a. and the LIBS measurement of step b. at a plurality of locations of the material involves moving the analysis spot over the material.

In some implementations, the method includes performing the infrared spectroscopic measurement of step a. and the LIBS measurement of step b. at one of the plurality of locations, and performing the infrared spectroscopic measurement of step a. and the LIBS measurement of step b. at a location underneath this one of the plurality of locations and exposed by the vaporizing of step b.

In accordance with another aspect, there is provided a system for characterizing an elemental composition and a molecular composition of material.

The system includes an infrared spectroscopic module for performing an infrared spectroscopic measurement on the material. The infrared spectroscopic module includes an infrared laser source configured for generating at least one infrared laser beam having a wavelength in the infrared domain and arranged to probe an analysis spot on the material with the at least one infrared laser beam. The infrared spectroscopic module further includes a photodetector configured for detecting light in the infrared domain resulting from an interaction of the laser beam with the material at the analysis spot.

The system further includes a LIBS module for performing a LIBS measurement on the sample. The LIBS module includes a LIBS pulsed laser source configured for vaporizing a volume of the sample at the analysis spot to obtain a plasma of the material, and a spectrally resolved light detector configured for detecting light from this plasma.

In some implementations, the infrared laser source is configured to vary a wavelength of the laser beam over a plurality of values in the infrared domain. The infrared laser source is spectrally tunable, and may for example include a Quantum Cascade Laser.

In some implementations, The infrared spectroscopic module may be configured in a dual-frequency comb scheme. For example, the infrared laser source may include a dual-frequency comb optical generator configured to generate optically coherent first and second infrared laser beams defining respective optical frequency combs at different first and second frequency spacings. The infrared laser source is further adapted to probe the material using one or both of these first and second infrared laser beams. The photodetector is configured to detect a heterodyne signal resulting from an interference between the first and second optical frequency combs.

In some implementations, the LIBS pulsed laser source may be operable at a first set of settings to perform said LIBS measurements, and may be further operable at a second set of settings to perform a laser cleaning shot to clean a surface of the material at the analysis spot.

In some implementations, the system may include a sample support for receiving a sample of the material thereon, and a positioning device on which is mounted the sample support. The positioning device is for example configured to move along a plane parallel to a surface of the sample. The positioning device may for example be embodied by a translation stage, a robotic manipulator, etc.

In some implementations, the system may include a beam steering optical assembly configured to move the analysis spot over the material.

The system may further include a controller system controlling the infrared spectroscopic module and the LIBS module, and/or a processor configured to analyze the infrared spectroscopic measurement and the LIBS measurement to characterize the molecular and the elemental composition of the material. The processor may for example be configured to perform a chemometric analysis on a combined dataset comprising the infrared spectroscopy measurement and the LIBS measurement.

Other features and advantages of the invention will be better understood upon reading of embodiments thereof with reference to the appended drawings.

DETAILED DESCRIPTION

Figure 1A:
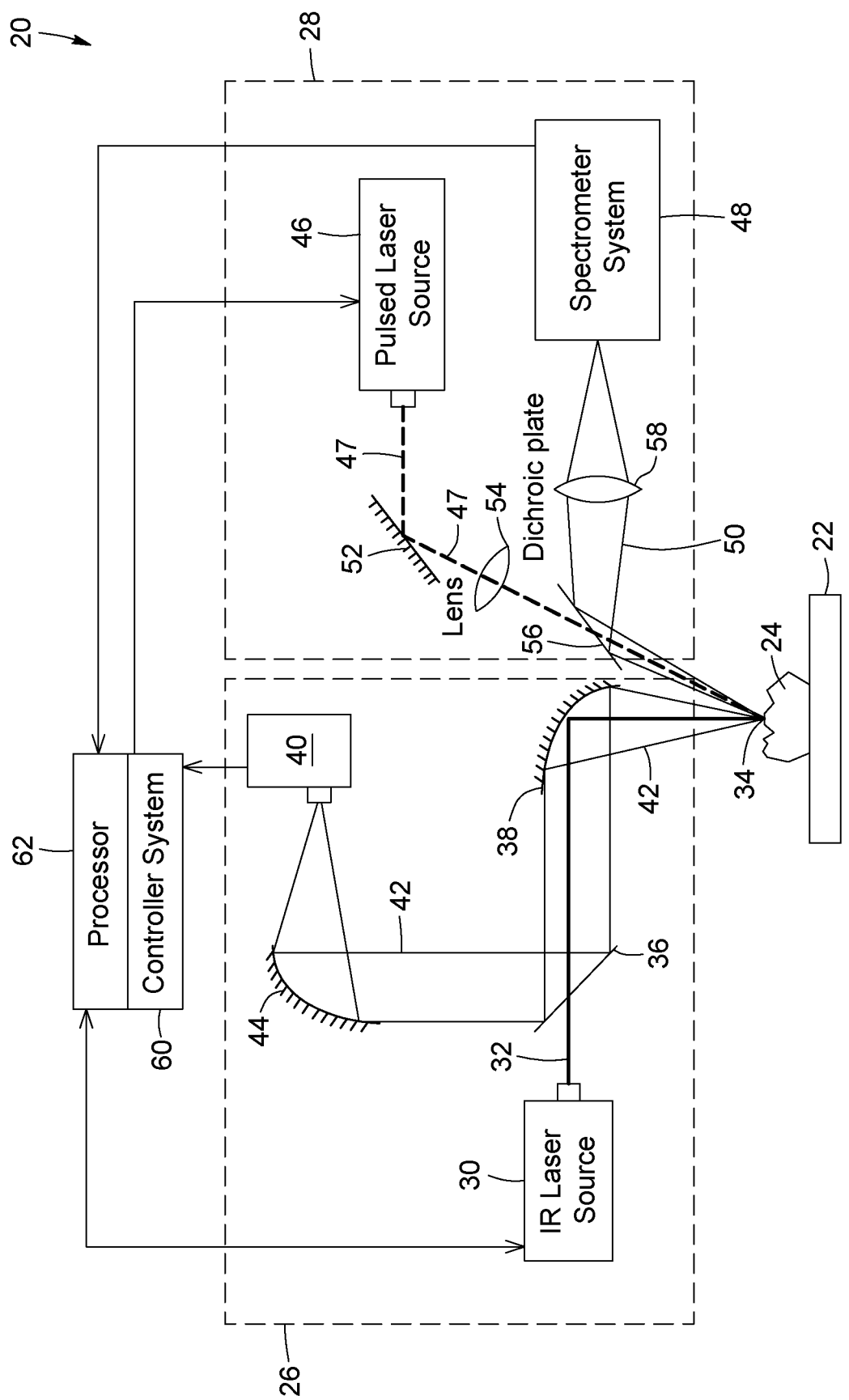
FIG. 1A is a schematic representation of a system including combined IR spectroscopy and LIBS modules according to an embodiment.

In accordance with various implementations, there is provided a method and a system for characterizing the elemental composition and the molecular composition of a material.

The method and system described herein may be used in a variety of contexts and applications, especially in circumstances where it is required, desired or of interest to characterize both the elemental and the molecular composition of a material. Examples of fields of application include soils or organic products analysis, the evaluation of minerals and other samples from the mining industry, material science and thin-film analysis, pharmaceutical products monitoring, material sorting and recycling, archeology and cultural artifacts studies, etc.

Broadly, the description below concerns a method according to embodiments which involve dual measurements at a same analysis spot of a material: an infrared spectroscopy measurement and a LIBS measurement.

According to some implementations, the method described herein includes a step of performing an infrared spectroscopic measurement on the material. The infrared spectroscopic measurement involves probing the sample at an analysis spot with an infrared laser beam, and detecting the intensity or other parameter of light resulting from the interaction of the laser beam with the material of the sample at this analysis spot.

Infrared (IR) spectroscopy is one of the most recognized techniques to determine the molecular content of a given material. IR spectroscopy can be performed using various optical setups and within a broad range of the electromagnetic spectrum. This approach probes vibrational motion of the sample constituents (e.g. stretching, bending, rocking, wagging, and twisting). The technique is typically implemented by first sending a beam of light having a wavelength or spectral contents in the IR domain onto a sample or object under study. The IR photons then interact with the molecular structure of the material in sample when the energy of the photons corresponds to the vibrational energy levels of the molecular bonds. The IR photons may be either absorbed, reflected or scattered. The light at the same wavelength resulting from these interactions is collected and the information is processed. For example, the spectral distribution of the collected light is related to the molecular composition of the sample: peak and dip features of the collected light are associated to specific molecular bonds. It will be understood that by definition, the IR spectroscopy process described herein excludes interaction with the material involving an energy transfer leading to a change of the photons' energy forming the resulting light compared to the photons' energy forming the probing light, such as is for example the case in Raman spectroscopy.

In the context of the present description, the IR domain may be understood to encompass spectral ranges typically designated in the art as the near-infrared (NIR) region between wavelengths of 0.7 µm and 2.5 µm, the mid-infrared (mid-IR) region between wavelengths of 2.5 µm and 25 µm, and the far infrared (FIR) region between wavelengths of 25 µm and 1 mm. By way of example, Mid-IR measurements between wavelengths of 2.5 µm and 25 µm probe most of the fundamental vibrational bands. NIR measurements between wavelengths of 0.7 µm and 2.5 µm often probe the vibrational frequency overtone bands which are linked to combination of vibrational displacements. Generally, fundamental bands in the mid-IR region are linked to a stronger material response and appear as cleaner spectral features. The present method may therefore include a step of analyzing the infrared spectroscopic measurements to characterize the molecular composition of the material. This analysis may be performed using techniques known in the art, and typically involves comparing the spectral variation of the interaction of the laser beam with the material of the sample with known molecular infrared reflection spectra to characterize the molecular composition of the material. Examples of such techniques are given further below.

In the art, IR spectroscopy is typically performed using an optical source emitting over a broadband frequency range, followed by a dispersive grating spectrometer or a Fourier-transform (FT) interferometer that retrieves the spectrum of the resulting light from an interferogram. In other words, both the probing light and the light resulting from the interactions of the probing light with the sample are broadband, and a spectrometer is required to decompose the resulting light spectrally for analysis. By contrast, the method described herein involves using a laser beam as a probing light.

As well understood by one skilled in the art, a laser beam is typically monochromatic or has a narrow spectral profile. Detecting the light resulting from the interaction of such a laser beam with the material therefore inherently provides spectrally resolved information. In some implementations, the present method therefore includes varying the wavelength of the laser beam over a plurality of values in the infrared domain, and detecting the intensity of the resulting light for each of said values, thereby obtaining a spectral variation of the interaction of the laser beam with the material at the analysis spot. By varying the wavelength of the laser beam, or setting the laser wavelength to different values, a spectrum of the IR properties of the sample can thus be obtained without requiring a spectrometer to decompose the resulting light. By way of example, the laser beam may be generated by a laser source based on optical parametric oscillators (OPO), on Raman lasers, on optical fiber lasers, on solid-state lasers, on dye lasers, or on semiconductor laser diodes. Laser signal emissions from OPO sources and Raman lasers are generated using nonlinear optical interaction of one or more laser pumping beam, and the laser signal emission frequency is tuned by selecting the proper nonlinear interaction and cavity conditions. Optical fiber lasers, solid-state lasers and dye lasers are based on rare-earth doped gain media, transition-metal doped gain media or molecular electronic transition gain media to generate laser emission. Semiconductor laser diodes are based on the electronic transition of semiconductor junctions. Semiconductor laser diode signal frequency is usually tuned using external cavities enabling a tuning range over few tens of nanometers. Semiconductor laser diodes are known for their compactness and their emission relies on electrical currents instead of another optical source. Their emission frequency is usually positioned in the visible and the NIR, but not the mid-IR.

In accordance with some embodiments, the IR laser beam may be generated using a tunable laser source. In some embodiments, the spectrally tunable laser source may be or include a Quantum Cascade Laser structure. Quantum cascade laser (QCL) sources, also known as interband cascade laser (ICL), take the form of semiconductor diode lasers, can emit in the mid-IR region with a large spectral power density and good beam focusing and steering capability known to laser sources. Typically, commercialized QCL-based systems are compact and can emit from a wavelength of 3 µm to 15 µm with various tuning ranges. For example, see U.S. Pat. No. 8,780,347 and U.S. Pat. App. No. 2016/0209325 and references therein.

In other embodiments, the infrared spectroscopic measurement may be implemented using a dual-frequency comb spectroscopy scheme. In such a case, first and second infrared laser beam are used, defining respective first and second optical frequency combs at different first and second frequency spacings $f_1$, $f_2$. The expression "optical frequency comb" is generally understood by those skilled in the art as describing a light beam having a spectral profile formed of multiple discrete emission bands centered at optical frequencies that are evenly spaced in the frequency domain. When two light beams composed of optical frequency combs with different frequency spacings share mutual optical coherence, interference between these two light beams leads to multiple heterodyne beats that originate from the interference of each discrete emission band pairs. Since the two optical frequency combs possess different frequency spacings, the heterodyne beat frequency for each emission band pair will be slightly different.

In some variants, only one the first and second infrared laser beams used for dual-frequency comb spectroscopy is impinged on the sample. In other variants, both infrared laser beams may probe the material at the analysis. The light resulting from the interaction of either infrared laser beam with the material at the analysis spot has a spectral profile which is also characterized by the optical frequency comb at the corresponding frequency spacing. Interference between both optical frequency combs therefore leads to an heterodyne interference signal such as explained above. Detection of this heterodyne signal using a photodiode or the like results in an electrical signal coming out of the photodiode which is also a frequency comb in the frequency domain, from which spectrally resolved information on the interaction of one or both of the infrared light beam with the sample may be obtained.

The method further involves a step of performing a LIBS measurement on the material.

As explained above, the acronym LIBS is well known in the art and stands for Laser-Induced Breakdown Spectroscopy. The LIBS measurement generally includes vaporizing a volume of the sample at the analysis spot using a LIBS pulsed laser source, thereby obtaining a plasma of the material, and making a spectrally resolved detection of light from this plasma.

LIBS provides fast, localized, non-contact, and sensitive measurements of the elemental composition of the material. LIBS is relevant for identifying major elements and trace elements, the latter being typically measured with a sensitivity of few parts per million (ppm). As such, the present method may include a step of analyzing the LIBS measurements to characterize the elemental composition of the material.

The infrared spectroscopic measurement and the LIBS measurement may be performed at a plurality of locations on the material. This may involve moving a sample of the material to bring different regions of this sample at the analysis spot. The sample may be moved within a plane parallel to its surface, therefore providing an analysis of a surface layer of the material. A volumetric analysis of the sample may also be performed. In some implementations, as the LIBS measurement at a given spot results in the vaporizing of the material present at this location, a new layer of the sample becomes exposed and accessible for analysis, enabling measurements to be taken at different depths. For example, the method may therefore involve performing the infrared spectroscopic measurement and the LIBS measurement at one the plurality of locations, and then performing same measurements at a location underneath the previous one. Depending on the depth of field of the laser beams at the analysis spot, several layers of material may be analyzed in such a matter without the need for realignment of the material with respect to the optical components. In other variants, the material may be moved along the depth axis to bring a newly exposed layer into focus. Depth analysis may of course be mixed with surface analysis in a variety of manners to provide a 3D image of the composition of a sample of the material.

In other variants, performing the infrared spectroscopic measurement and the LIBS measurement at a plurality of locations of the sample may involve moving the analysis spot over the material, which can be kept stationary or may optionally also be moved. This can for example be done through the use of galvanometric mirrors in the paths of both laser beams, as is well known in the art.

The information from different locations on the material may be obtained sequentially, by performing both measurements at a first location, moving the spatial relationship between the material and the analysis spot, and then performing both measurements at the new location, this sequence being repeated for each new location. The spatial relationship between the material and the analysis spot can be changed by moving the material, moving the focus point of both laser beams, or a combination thereof, as mentioned above. Pairs of infrared spectroscopy measurement and LIBS measurement need not, however be performed sequentially in all implementations. For example, one variant may involve performing all the infrared spectroscopic measurement for a set of locations on the material, and subsequently performing all the LIBS measurement for the same set of locations. In other variants, only the infrared spectroscopy measurement may be performed at various locations on the material as a pre-characterizing step, and the LIBS measurements may follow only for locations where the results of the infrared spectroscopy measurement or other analysis indicate the presence of elements to be characterized. Of course, one skilled in the art will readily understand that as LIBS measurements are inherently destructive in nature, one constraint on some implementations of the method is that for locations to be characterized through both infrared spectroscopy and LIBS, the infrared spectroscopy measurement should be performed before the LIBS measurement.

The present method may further involve a preliminary step, before performing the infrared spectroscopic measurement and LIBS measurement, of cleaning a surface of the material at the analysis spot. This may for example be accomplished by performing a laser cleaning shot, for example using the LIBS pulsed laser source. As will readily be understood be one skilled in the art, a laser cleaning shot may involve impinging a laser beam on the surface of the material according to optical parameters which lead to the creation of a shock wave suitable to dislodge unwanted particles from the surface. In some implementations, the LIBS pulsed laser source may be operated according to parameters different than the operation parameters for performing the LIBS measurements. In other variants, a separate laser may be used for the same purpose. Multiple laser cleaning shots may be necessary to achieve the desired degree of cleanliness of the surface at a given location prior to proceeding with the infrared spectroscopy and/or LIBS measurements. As will be readily understood, laser cleaning shots may be performed at any instance throughout the implementation of the present method at which the cleaning of the material surface is considered necessary or desirable.

Figure 2:
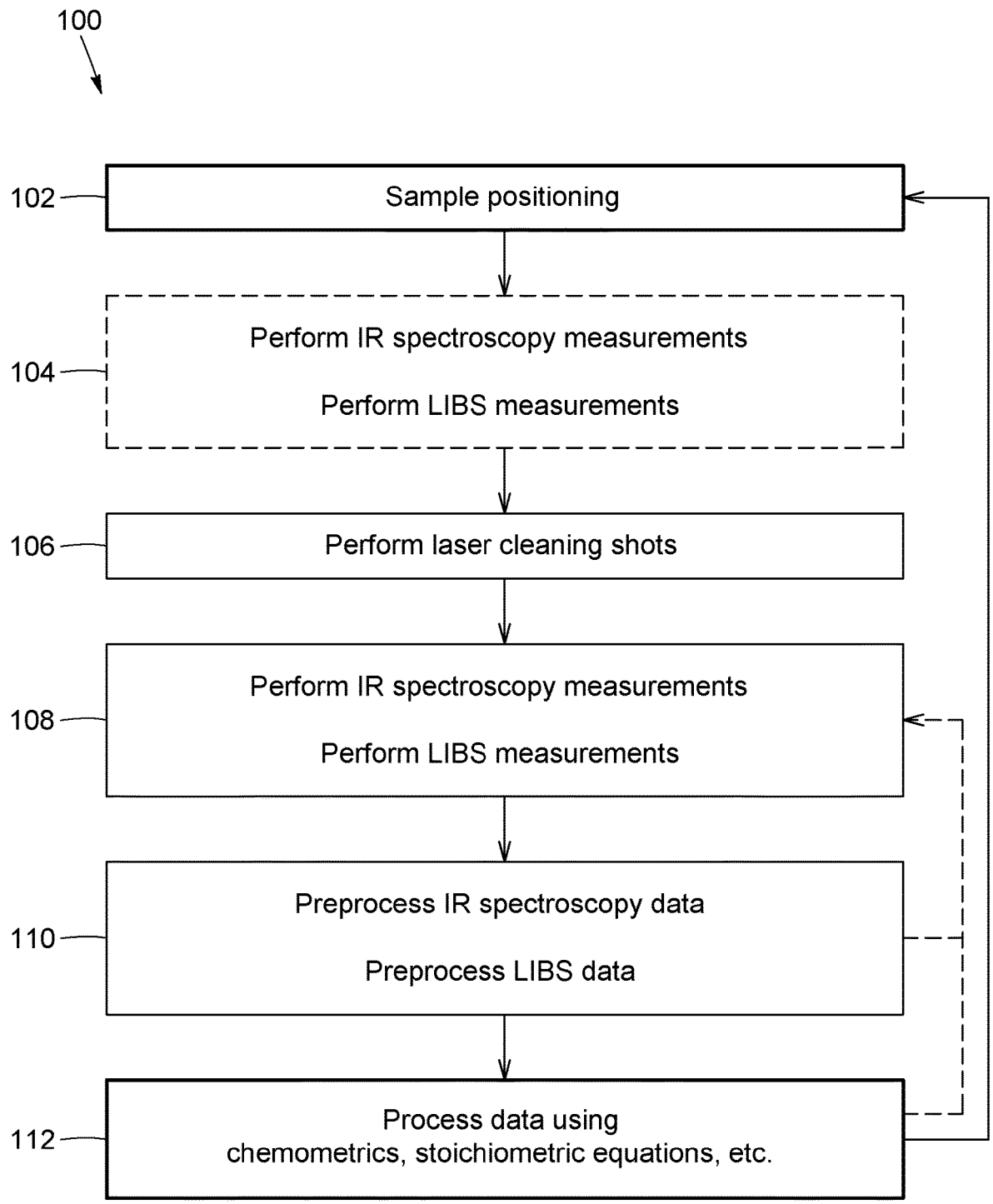
FIG. 2 is a flow chart of a possible measurement protocol embodying a method according to an embodiment.

FIG. 2 shows one possible measurement protocol embodying a method 100 for characterizing an elemental composition and a molecular composition of a material using the above combined LIBS and laser-based IR spectroscopy approach.

In this embodiment, the method first includes a step of positioning 102 a sample of the material in a suitable system, with a region of interest of this sample positioned at the LIBS and IR laser same probing point, defining the analysis spot. An example of a system which can be used for this protocol is shown in FIG. 1A and will be described further below. The positioning can for example be done using a translation stage or other positioning device that moves the sample, or it can be done by steering both the LIBS and IR laser beams at the required analysis spot, as mentioned above. Initial IR spectroscopy measurements and LIBS measurements 104 can optionally be performed to determine the constituents of the surface layer of the sample. The measurement order between IR spectroscopy and LIBS and the number of measurements for each implementation of the method may depend on the sampling strategy.

The surface material of a sample is typically contaminated with dust, which can saturate the resulting IR and/or LIBS spectra with elements found in ambient conditions such as calcium and sodium. In some implementations, one or more laser cleaning shots may be performed 106 to remove contaminants and prepare the surface of the sample. The optimal number of cleaning shots may depend on the light pulse parameters and the material characteristics, as know in the art.

Once the surface is cleaned, IR spectroscopy measurements and LIBS measurements are respectively performed 108. The measurement order between IR spectroscopy and LIBS and the number of measurements for each method depend on the sample characteristics and the sampling strategy.

The spectral data obtained from both measurement techniques is then used to determine the constituents of the material.

It is to be emphasised that the method described herein provides IR spectroscopy measurements and LIBS measurements for the same analysis spot on the sample or in the material. Having two datasets for the same analysis spot containing together elemental and molecular information has a significant advantage over uncorrelated datasets. One can not only perform data analysis on each dataset separately, but one can also join, based on the analysis spot locations, the datasets or join the previously analyzed results of each dataset to perform a more precise elemental and molecular analysis.

It is well known in the art that chemometric methods enable qualitative and quantitative analysis of individual or fused datasets. In way of example, predictive models for the determination of the mineralogy and the elemental composition of unknown samples are usually calibrated using unsupervised or supervised chemometric methods such as Principal Component Analysis, Hierarchical Cluster Analysis, Support Vector Machines-Discriminant Analysis, or Partial Least Square Regression-Discriminant Analysis. More specifically, by way of example, one could build a chemometric model where the albite ($NaAlSi_3O_8$) and the anorthite ($CaAl_2Si_2O_8$) fractions of a plagioclase feldspar sample are determined in the presence of calcite ($CaCO_3$) which may misrepresent the Ca signal emission in a LIBS spectrum.

Data analysis usually includes preprocessing 110 steps such as baseline corrections, spectra normalization, and scaling procedures, before processing 112 the data. Data processing refers to the combination of datasets and the datasets analysis. These tasks can be accomplished using a combination of techniques, from the simplest such as manual identification of peaks to more complex such as chemometrics and machine-learning data analysis, and stoichiometry balance equations. For example, in order to find major element constituents, one may use partial least squares discriminant analysis (PLS-DA) to match LIBS and IR spectra to reference spectra or databases spectra. The additional dataset provided by IR spectroscopy allows a more precise identification of relevant LIBS information, and vice versa. Once the major elements and minerals are found, LIBS data can be used to identify valuable trace elements. After data analysis, one may decide to perform LIBS and IR spectroscopy measurements again, for example to validate the previous measurements.

IR spectroscopy spectral data may need additional preprocessing to convert raw or preprocessed reflectance data into absorption data because many spectral IR databases are based on absorption spectra. The reflectance spectrum of a material is related to its refractive index spectrum and its absorption spectrum. Thus, in some cases, one may compute an absorption spectrum from the reflectance spectrum. For example, a Kramers-Kronig algorithm may be used on the IR reflectance spectral data to retrieve the absorption spectrum (see for example Roessler, D. M. «Kramers-Kronig analysis of reflection data», Brit. J. Appl. Phys., vol. 16, no. 9, pp. 1119-1123, 1965; Roessler, D. M. «Kramers-Kronig analysis of non-normal incidence reflection», Brit. J. Appl. Phys., vol. 16, no. 9, pp. 1359-1366, 1965; Grosse, P. and Offermann, V. «Analysis of Reflectance Data Using Kramers-Kronig Relations», Appled Physics A, vol. 52, no. 2, pp. 138-144, 1991; Yamamoto, K. and Ishida, H. "Optical theory applied to infrared spectroscopy", Vibrational Spectroscopy, vol. 8, no. 1, pp. 1-36, 1994). The comparison with absorption IR database is then possible.

The measurement protocol described with respect to FIG. 2, which is applicable for a single location on the material, can be repeated at other locations to form a representative 2D elemental and molecular image of the material. Furthermore, one may repeat the measurement protocol at different locations along a same depth axis, to form a depth elemental and molecular profile of the material. Moreover, both in-plane and in-depth measurements can be performed to create a 3D bulk elemental and molecular representation of the material. Although the cleaning and digging laser shots can be performed using the same laser source that is used for LIBS measurements, a different pulsed laser source may be used to perform these procedures.

System According to an Embodiment

Referring to FIG. 1A, there is shown an example of a system 20 according to one embodiment. The system may be based on components known in the art of optics and spectroscopy and their specific operation and assembly are not critical to the operation of the method above. It will be readily understood that the configuration of the illustrated system 20 is shown by way of example only and that the methods described herein may be carried out using different sets of components arranged in a variety of manners without departing from the scope of protection.

In the illustrated embodiment, the system 20 includes a sample support 22 for receiving the sample 24. The sample support 22 may be embodied by any structure able to receive and hold in place the sample 24. By way of example, a clamp may hold the sample to expose a specific portion. It is however to be understood that the material being analyzed through the method described herein and/with the present system may be a portion of a wall, terrain, etc. and that the expression a sample is not meant to be understood as limited to a representative portion separated from a greater whole.

The system further includes a set of components which together define two operational modules: an infrared spectroscopic module 26, for performing the IR spectroscopic measurement on the sample 24, and a LIBS module 28, for performing a LIBS measurement on the sample 24.

The infrared spectroscopic module 26 includes an infrared laser source 30 configured for generating an infrared laser beam 32. The infrared laser beam 32 may for example be generated from electronic transitions within a quantum cascade laser structure; electronic transitions within rare-earth doped gain media, transition-metal doped gain media, or molecular electronic transition gain media;

from nonlinear optics generation; from Raman effect, or a combination thereof. The infrared laser source 30 may be configured to vary the wavelength of the laser beam 32 over a plurality of values in the IR domain, which is understood to cover the NIR, mid-IR and FIR ranges as explained above. The infrared laser source 30 may be configured to emit a pulsed or a continuous-wave light beam 32.

It will be readily understood that the infrared laser source 30 may be embodied by a combination of different laser devices and may further include additional optical components influencing the optical properties of the infrared laser beam 32 without departing from the scope of the present invention.

In one implementation, the infrared laser source 30 may be spectrally tunable, and may for example be embodied by a Quantum Cascade Laser (QCL). Commercialized mid-IR tunable QCL sources can typically be operated to tune the laser optical frequency over a 1000 cm$^{-1}$ range within 100 ms. Spectrally tunable laser sources are generally understood as lasers having a user-controllable spectral output, such as through the control of the input current of a semiconductor-type laser. In other variants, the variation in the wavelength of the infrared laser beam 32 may be obtained by switching between different laser cavities to generated this laser beam. By way of example, the infrared laser source 30 may include two or more lasers or an array of laser diodes each operable at a different wavelength, and a control system allowing the respective laser beams generated by these systems to be outputted sequentially. All of these variations are understood to fall within the meaning of "tunable infrared laser source" are used herein.

The infrared laser source 30 is arranged to probe an analysis spot 34 on the sample 24 mounted on the sample support 22 with the infrared laser beam 32. As is well known in the art, laser beams are spatially confined rays with low divergence, allowing their generation at a distance from the intended target and easy steering and redirecting to reach this target.

The infrared spectroscopy module 26 further includes a photodetector 40 configured for detecting the light resulting from the interaction of the laser beam 32 with the material of the sample 24 at the analysis spot 34, hereinafter referred to as the resulting light 42. Advantageously, as the spectral variation of the infrared response of the material determined by the variation in the wavelength of the probing infrared laser beam 32, the photodetector 40 is not required to provide spectrally resolved information. A spectrometer is not necessary, although in some implementations one may be used. The photodetector 40 may for example be embodied by a photodiode. In some variants, the photodetector 40 may be configured to convert the detected resulting light to a readable electrical signal, such as a photoconductive detector, a photovoltaic detector, a pyroelectric detector, or a combination thereof. The detected resulting light beam may be measured and characterized using the light polarization, the signal phase based on a homodyne or heterodyne method, or a combination thereof. By way of example, a transparent polarizing element may be placed in front of the photodetector 40 and can be rotated to reveal IR spectral features that are sensitive to polarization changes. In the case of phase measurement implying homodyne or heterodyne methods, interferometric optical systems may to be used. In another example, if a dual-frequency comb scheme is used the photodetector 40 may be an optical beatnote detection device, configured to detect the heterodyne signal 42 resulting from an interference between two optical frequency combs.

Figure 1B:
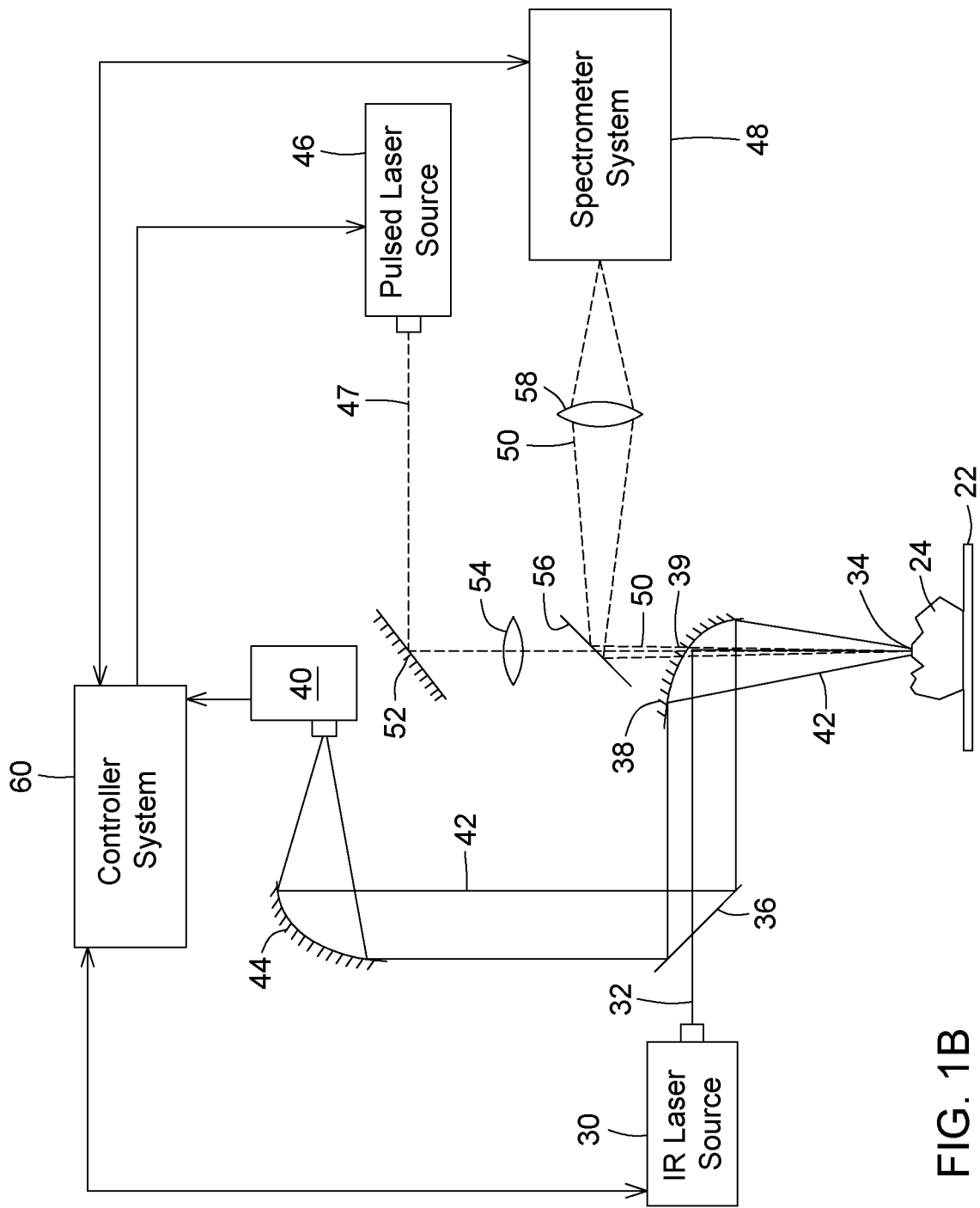
FIG. 1B is a schematic representation of an alternative configuration to the system of FIG. 1A.
Figure 1C:
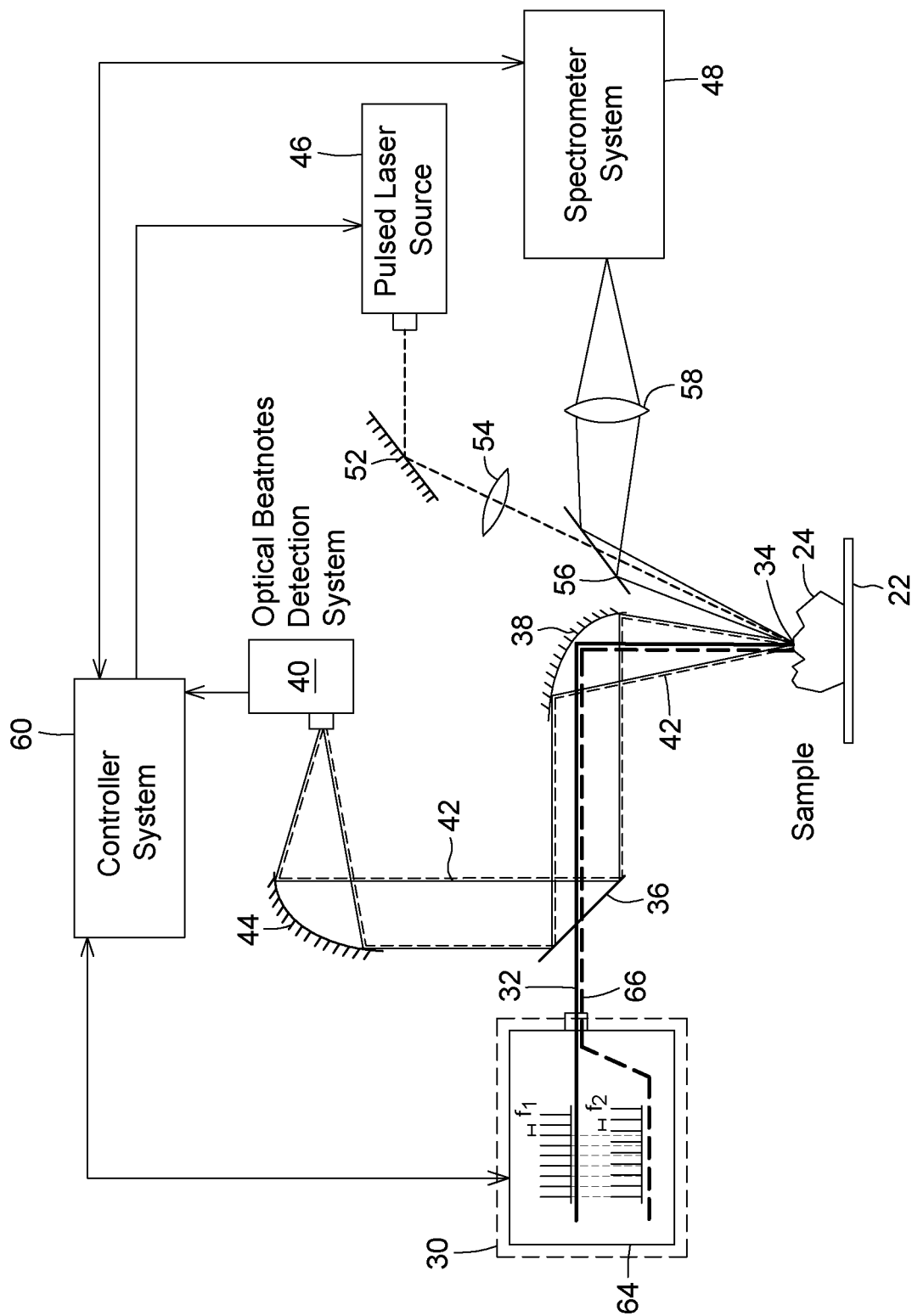
FIG. 1C is a schematic representation of another alternative configuration to the system of FIG. 1A.

Referring to FIG. 1C, in embodiments employing a dual-frequency comb scheme, the infrared laser source 30 may include a dual-frequency comb optical generator 64 configures to generate optically coherent first and second infrared laser beams 32 and 66, having respective optical frequency combs at different first and second frequency spacings $f_1$, $f_2$. In the illustrated embodiment, both the first and second infrared laser beams 32 and 66 probe the sample, and the light from the sample results from the interaction of both infrared laser beams 32 and 66 with the material at the analysis spot 34. The spectral variation of the infrared response of the material modulates both frequency comb distributions. It will be understood that in other variants, only one of the infrared laser beams 32, 66 may interact with the sample, the light resulting from the interaction of the infrared laser beam with the sample interfering directly with the other one of the infrared laser beams at the detector.

The system 20 described herein may further include any number of beam steering optics components collectively enabling the infrared laser beam 32 to travel from the infrared laser source 30 to the analysis spot 34, and the resulting light 42 to travel from the sample to the photodetector 40. In the illustrated embodiment, by way of example only, the system 20 includes a beamsplitter 36 positioned at the output of the infrared laser source 30, which substantially allows the infrared laser beam 32 therethrough, and a first parabolic mirror 38 redirecting and focusing the infrared laser beam 32 on the analysis spot 34. The resulting light 42 generated through the interaction of the infrared laser beam 32 with the material of the sample at the analysis spot is collected by the first parabolic mirror 38 and reflected towards the beamsplitter 36. Still in the illustrated configuration, the infrared spectroscopy module 26 includes a second parabolic mirror 44 which is positioned to receive the resulting light 42 reflected on the beamsplitter 36 and focus the same on the photodetector 40.

Still referring to FIG. 1A, in the illustrated embodiment the LIBS module 28 includes a LIBS pulsed laser source 46. The LIBS pulsed laser source is configured for emitting a pulsed laser beam 47 for vaporizing a volume of the sample 24 at the analysis spot 34 to obtain a plasma of the material. In some embodiments, the LIBS pulsed laser source is operable at different settings depending on its intended use, for example at a first set of settings to perform the LIBS measurements, and at a second set of settings to perform laser cleaning shots such as explained above. By way of example, the LIBS pulsed laser source may be embodied by a pulsed Nd:YAG laser source that generates laser pulses at a wavelength of 1064 nm. The pulses energy and duration are determined by the task to accomplish: cleaning, material removal or the LIBS measurement itself. The pulses energy may vary from few microjoules to hundreds of millijoules. The pulses duration may vary from a few femtoseconds to hundreds of nanoseconds. The beam intensity typically reaches the GW/cm$^2$ regime at the analysis spot 34. The laser repetition rate depends on the laser source parameters and is typically of few Hz up to hundreds of kHz.

The LIBS module further includes a spectrally resolved light detector 48 configured for detecting light from the plasma, hereinafter referred to as "plasma light 50". The spectrally resolved light detector 48 may for example include optics, mirrors, and one or more spectrometers. Spectrometers are chosen following the required measurement needs. Key parameters of a spectrometer are, but not limited to, its optical throughput, its sensitivity, its spectral range, its spectral resolution, and its capability to timely gate the measurement.

The system 20 described herein may further include any number of beam steering optics components collectively enabling the pulsed laser beam 47 to travel from the pulsed laser source 46 to the analysis spot 34, and the plasma light 50 to travel from the plasma to the spectrally resolved detector 48. In the illustrated embodiment, by way of example only, the system 20 includes a mirror 52, a first lens 54 and a dichroic plate 56 successively in the path of the pulsed laser beam 47. The laser beam 47 is directed and focused on the same analysis spot 34. The beam diameter at the sample 24 may typically vary between 10 µm and 500 µm and is typically chosen following the measurement needs. The laser pulses vaporize and ionize a portion of the sample 24 at the analysis spot to form a plasma. The plasma light is reflected off the dichroic plate 46 and focused on the spectrally resolved detector 48 through a second lens 58.

It will be readily understood that other configurations could be envisioned by one skilled in the art for the system described herein. By way of example, FIG. 1B shows an alternative configuration to the system of FIG. 1A where the resulting light 42 from the interaction of the IR laser beam 32 with the material and the plasma light 50 from the LIBS module are collected colinearly. In this variant, the first parabolic mirror 38 has an opening 39 in its center through which the pulsed laser beam 47 from the LIBS pulsed laser source 46 can pass towards the sample 24. The plasma light 50 in turn can propagate through the same hole 39 to reach the dichroic plate 56 and be reflected towards the spectrometer system 48.

It will be readily understood that the infrared spectroscopy module 26, the LIBS module 28 or other portions of the system 20 may include any optical or mechanical components which are designed and positioned to act on any of the photons circulating through the system 20. Such components may steer, direct, shape, focus, modulate, filter or otherwise act on light as is well known in the art. Such components may include mirrors, lenses, gratings, polarizers, filters, etc.

Furthermore, it will be understood that various portions of the system 20 may guide light using free-space optics or fiber optics as well known in optical arts.

The source and detection devices of both the IR spectroscopy and the LIBS modules 26 and 28, that is, the infrared laser source 30, the photodetector 40, the pulsed laser source 46 and the spectrally resolved detector 48, may be controlled by a common controller system 60. The controller system 60 may include any suitable components and subsystems known in the art, such as an acquisition card, a computer and the like. For example, the computer may be used to set and operate all the source and detection devices, to gather the data from the acquisition card and the detection devices, and to preprocess and analyze the spectral data through a processor 62. In other variants, the collected data may be extracted from the controller system 60 for processing and analysis in a different location. The controller system 60 may include electronics that allow time gating operations and synchronisation between the LIBS pulsed laser source and the spectrometer system. The spectrometer system then transfers the spectrum data to the controller system where it can be processed.

EXAMPLES

Figure 3:
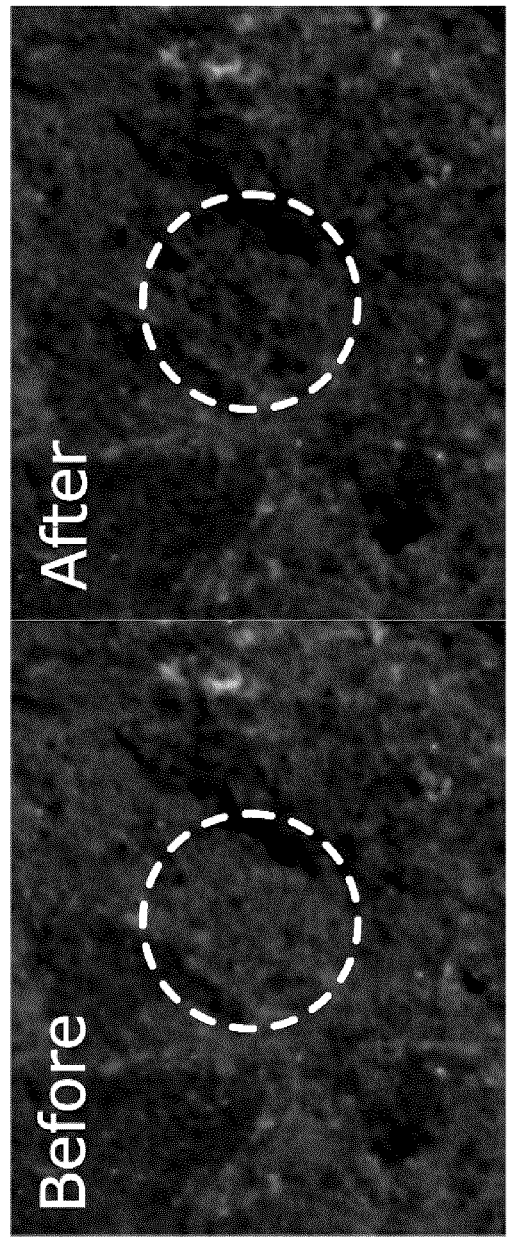
FIG. 3 illustrate the surface of an augite mineral sample before and after LIBS cleaning shots.
Figure 4:
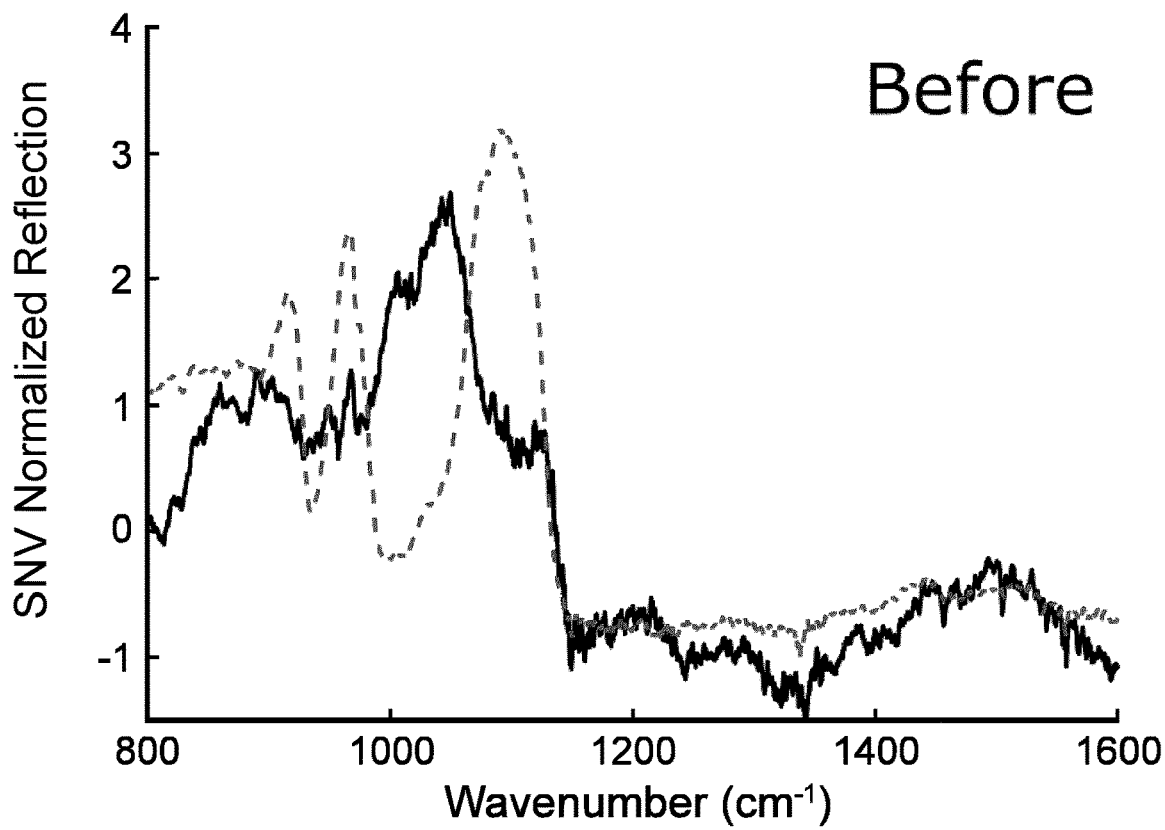
FIGS. 4A and 4B show the laser-based IR bi-directional reflectance spectroscopy spectra of augite mineral respectively before and after ten LIBS cleaning shots.
Figure 4:
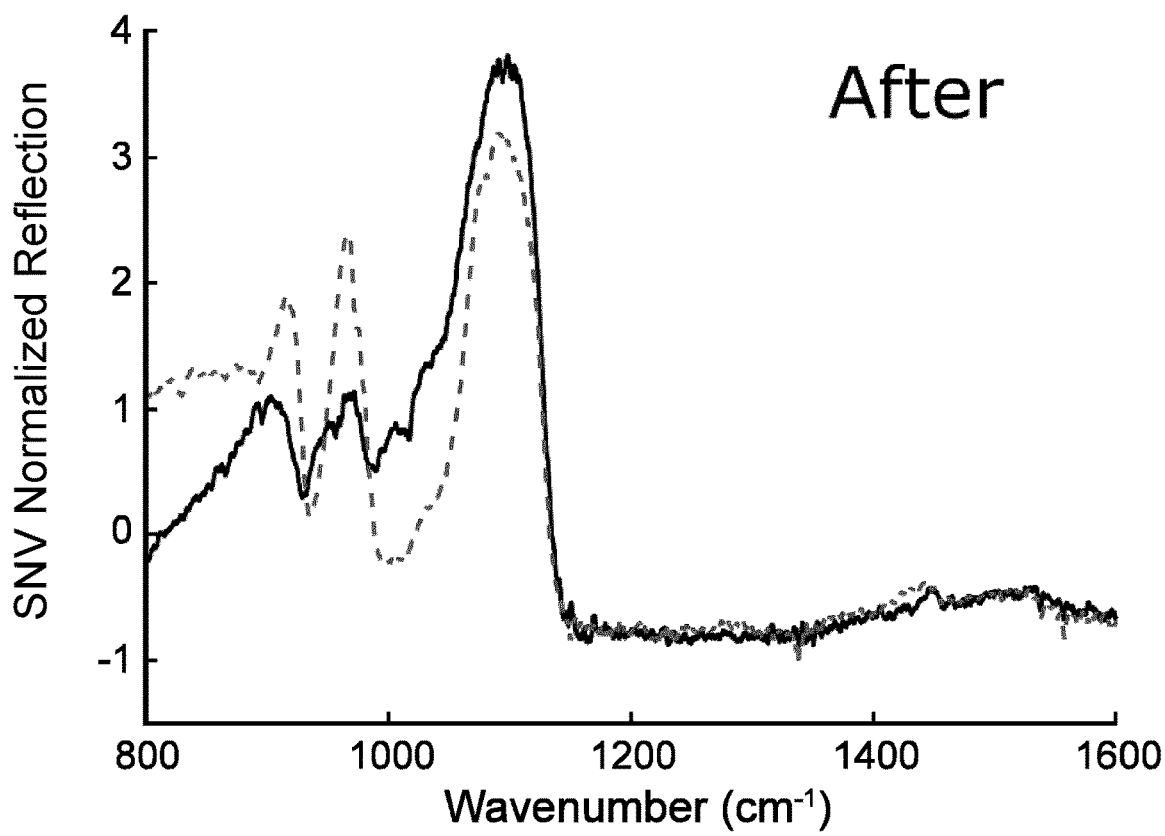

As mentioned above, IR spectroscopy measurements and LIBS measurements may be sensitive to the condition of the surface of the material and contaminants such as dust or a thin layer of unwanted material. Performing laser cleaning shots can be advantageous in some implementations to remove unwanted particles from the surface of the sample. By way of example, FIG. 3 shows the surface of an augite mineral sample before and after laser cleaning shots performed using the LIBS pulsed laser source. After a few cleaning shots, a dark green spot is visible where the cleaning shots hit, revealing the augite mineral. The laser pulses used to remove the top layer were 9 ns long, carried approximatively 50 mJ, and have a center wavelength of 1064 nm. FIGS. 4A and 4B respectively show the laser-based IR bi-directional reflection spectroscopy spectra taken at the same location (black lines) before and after ten LIBS cleaning shots. The spectra are normalized using the standard normal variate (SNV) normalization. For indication, the spectrum taken on the same augite mineral sample at a manually cleaned location is superposed to the measurements and is shown as a dotted line. One can clearly see the effect of the LIBS cleaning shots on the IR spectroscopy spectra: reflection bands that were not present before cleaning now appear to match the reflection bands measured at the manually cleaned location.

Figure 5:
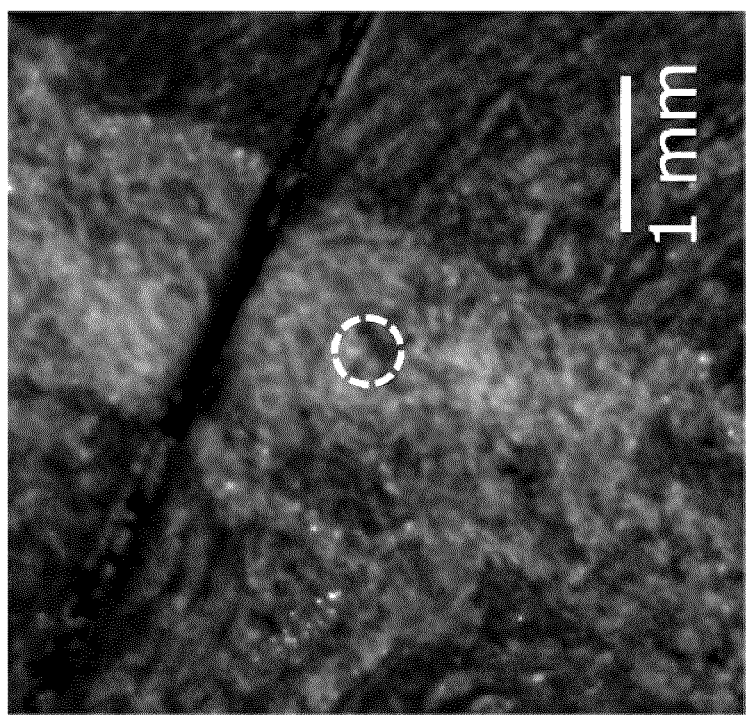
FIG. 5 displays the sub-millimeter scale mineral heterogeneity found in ore and rock samples. The white dotted circle indicates the location where the LIBS and laser-based IR bi-directional reflectance spectroscopy spectra were measured.
Figure 6:
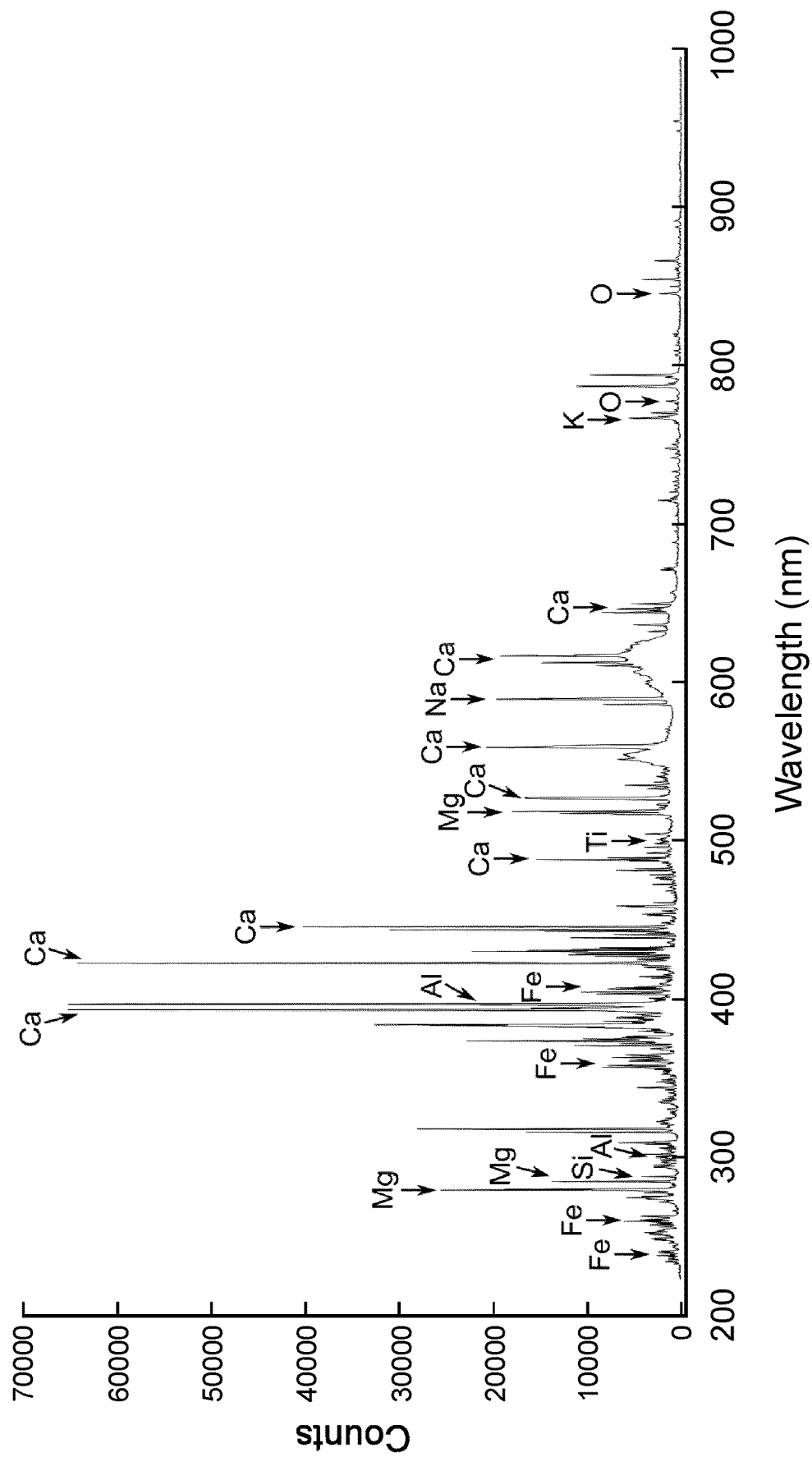
FIG. 6 shows a LIBS spectrum measured on the heterogeneous mineral sample shown in FIG. 5.
Figure 7:
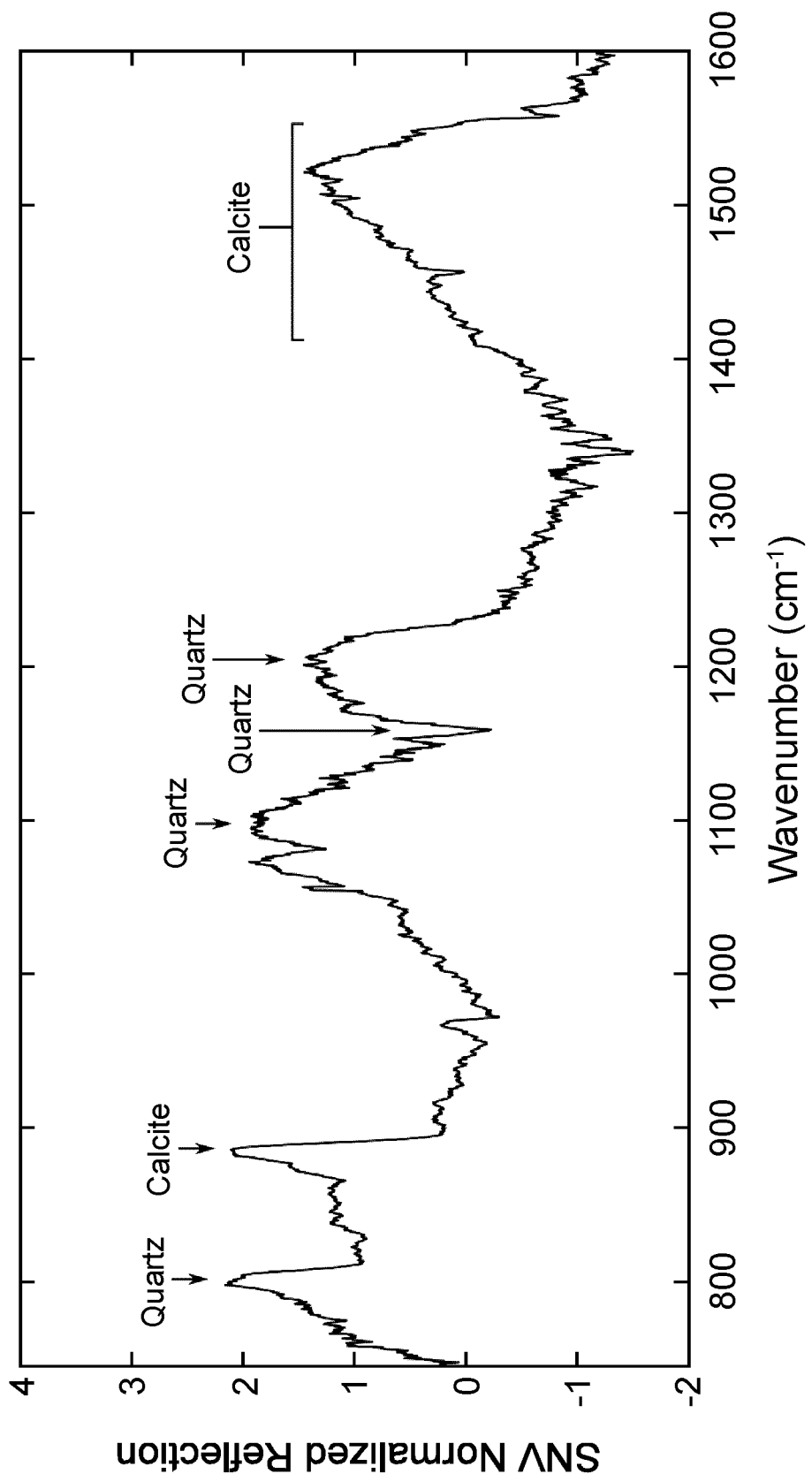
FIG. 7 shows a laser-based IR bi-directional reflectance spectroscopy spectrum measured on a heterogeneous mineral sample shown in FIG. 5 at the same location as the LIBS spectrum of FIG. 6.

Dual LIBS and laser-based IR spectroscopy measurements are often necessary to fully determine the constituents of a sample at the elemental and the molecular levels. FIG. 5 displays an image of an ore sample demonstrating the sub-millimeter scale mineral heterogeneity usually found in ore and rock samples. The white dotted circle indicates the location where the LIBS and laser-based IR bi-directional reflectance spectroscopy spectra were measured. The LIBS spectrum and the IR reflectance spectrum are shown in FIGS. 6 and 7 respectively. The LIBS spectrum in FIG. 6 indicates the presence of many elements commonly found in the mining sector: Si, O, Ca, Al, Na, K, Mg, Fe and Ti. Several intense LIBS emission peaks due to Fe element are interfering with other peaks and make it difficult to analyze the spectrum. This is a known challenge with transition metals that displays several intense peaks between 200 nm and 600 nm. Consequently, it is an issue when one tries to reconstruct the molecular composition of the sample from the LIBS spectrum, on top of matrix effects and nonlinear peak behaviors that affect peak intensities. Based on the elements found in LIBS, many mixtures of minerals may fit the description: quartz ($SiO_2$), calcite ($CaCO_3$), microcline ($KAlSi_3O_8$), albite ($NaAl_2Si_3O_8$), or many more silicates. Consequently, it is hard to conclude on the mineral that are present. The IR reflectance spectrum in FIG. 7 gives a clearer picture of the molecular composition of the sample at the probed location. Visible bands of quartz and calcite dominate the reflection spectrum and determine the two major mineral matrices of the sample at the probed location. The presence of Al, Na, K, Ti and Fe may be part of silicate minerals or ferrous minerals not seen in the IR reflectance spectrum.

Of course, numerous modifications could be made to the embodiments above without departing from the scope of the invention as defined in the appended claims.

The invention claimed is:

1. A method for characterizing an elemental composition and a molecular composition of a material, comprising:
   a. performing an infrared spectroscopic measurement on said material, said infrared spectroscopic measurement comprising probing said material at an analysis spot with an infrared laser beam and varying a wavelength of the infrared laser beam over a plurality of values in the infrared domain, and detecting, for each of said values, light in said infrared domain resulting from an interaction of the infrared laser beam with the material at said analysis spot, thereby obtaining a spectral variation of the interaction of the laser beam with the material at said analysis spot;
   b. performing a LIBS measurement on said material, said LIBS measurement comprising vaporizing a volume of the material at said analysis spot using a LIBS pulsed laser source, thereby obtaining a plasma of said material, and making a spectrally resolved detection of light from said plasma;

wherein the infrared spectroscopic measurement of step a. and the LIBS measurement of step b. are performed at a plurality of locations of said material.

2. The method according to claim 1, comprising generating the infrared laser beam using a spectrally tunable laser source.

3. The method according to claim 1, comprising a preliminary step of cleaning a surface of the material at said analysis spot by performing one or more laser cleaning shots using the LIBS pulsed laser source.

4. The method according to claim 1, comprising:
performing the infrared spectroscopic measurement of step a. for a set of said locations on the material; and
subsequently performing the LIBS measurement of step b. for said set of said locations on the material.

5. The method according to claim 1, further comprising a step of analyzing the infrared spectroscopic measurement obtained at step a. to characterize the molecular composition of the material.

6. The method according to claim 1, further comprising comparing the spectral variation of the interaction of the laser beam with the material with known molecular infrared reflection spectra to characterize the molecular composition of the material.

7. The method according to claim 1, further comprising a step of analyzing the LIBS measurement obtained at step b. to characterize the elemental composition of the material.

8. The method according to claim 1, further comprising a step of analyzing a combined dataset comprising the infrared spectroscopy measurement and the LIBS measurement to characterize the molecular and elemental composition of the material.

9. The method according to claim 1, wherein performing the infrared spectroscopic measurement of step a. and the LIBS measurement of step b. at a plurality of locations on said material comprises moving the material to bring different regions thereof at said analysis spot.

10. The method according to claim 1, wherein performing the infrared spectroscopic measurement of step a. and the LIBS measurement of step b. at a plurality of locations of said material comprises moving the analysis spot over said material.

11. The method according to claim 1, comprising:
performing the infrared spectroscopic measurement of step a. and the LIBS measurement of step b. at one of said plurality of locations; and
performing the infrared spectroscopic measurement of step a. and the LIBS measurement of step b. at a location underneath said one of said plurality of locations and exposed by the vaporizing of step b.

12. A system for characterizing an elemental composition and a molecular composition of material, comprising:
an infrared spectroscopic module for performing an infrared spectroscopic measurement on said material, comprising:
a spectrally tunable infrared laser source configured for generating an infrared laser beam and to vary a wavelength of the laser beam over a plurality of values in the infrared domain, the infrared laser source being arranged to probe an analysis spot on the material with said infrared laser beam; and
a photodetector configured for detecting light in said infrared domain resulting from an interaction of the laser beam with the material at said analysis spot; and
a LIBS module for performing a LIBS measurement on said sample, comprising:
a LIBS pulsed laser source configured for vaporizing a volume of the sample at said analysis spot to obtain a plasma of said material; and
a spectrally resolved light detector configured for detecting light from said plasma.

13. The system according to claim 12, wherein the LIBS pulsed laser source is operable at a first set of settings to perform said LIBS measurements, and is further operable at a second set of settings to perform a laser cleaning shot to clean a surface of the material at said analysis spot.

14. The system according to claim 12, further comprising a sample support for receiving a sample of the material thereon, and a positioning device on which is mounted the sample support.

15. The system according to claim 12, comprising a beam steering optical assembly configured to move the analysis spot over said material.

16. The system according to claim 12, further comprising a controller system controlling the infrared spectroscopic module and the LIBS module.

17. The system according to claim 12, further comprising a processor configured to analyze the infrared spectroscopic measurement and the LIBS measurement to characterize the molecular and the elemental composition of the material said processor being further configured to perform a chemometric analysis on a combined dataset comprising the infrared spectroscopy measurement and the LIBS measurement.

18. A system for characterizing an elemental composition and a molecular composition of material, comprising:
an infrared spectroscopic module for performing an infrared spectroscopic measurement on said material, comprising:
an infrared laser source comprising a dual-frequency comb optical generator configured to generate optically coherent first and second infrared laser beams defining respective optical frequency combs at different first and second frequency spacings, said infrared laser source being adapted to probe an analysis spot on the material using one or both of said first and second infrared laser beams; and
a photodetector configured for detecting light in said infrared domain resulting from an interaction of one or both of said first and second infrared laser beams with the material at said analysis spot, the photodetector being further configured to detect a heterodyne signal resulting from an interference between said first and second optical frequency combs; and
a LIBS module for performing a LIBS measurement on said sample, comprising:
a LIBS pulsed laser source configured for vaporizing a volume of the sample at said analysis spot to obtain a plasma of said material; and
a spectrally resolved light detector configured for detecting light from said plasma.

19. The system according to claim 18, wherein the photodetector comprises an optical beatnote detection device.

20. The system according to claim 18, wherein both the first and second infrared laser beams probe the analysis spot on the material, and the photodetector detects light resulting from an interaction of both infrared laser beams with the material at the analysis spot.

* * * * *